US011198114B2

(12) United States Patent
Jongkind et al.

(10) Patent No.: US 11,198,114 B2
(45) Date of Patent: Dec. 14, 2021

(54) CATALYST SYSTEM FOR DEWAXING

(71) Applicant: SHELL OIL COMPANY, Houston, TX (US)

(72) Inventors: Hermanus Jongkind, Amsterdam (NL); Marcello Stefano Rigutto, Amsterdam (NL)

(73) Assignee: SHELL OIL COMPANY, Houston, TX (US)

(*) Notice: Subject to any disclaimer, the term of this patent is extended or adjusted under 35 U.S.C. 154(b) by 0 days.

(21) Appl. No.: 16/469,433

(22) PCT Filed: Dec. 13, 2017

(86) PCT No.: PCT/EP2017/082643
§ 371 (c)(1),
(2) Date: Jun. 13, 2019

(87) PCT Pub. No.: WO2018/109015
PCT Pub. Date: Jun. 21, 2018

(65) Prior Publication Data
US 2020/0094231 A1 Mar. 26, 2020

(30) Foreign Application Priority Data
Dec. 16, 2016 (EP) .................... 16204786

(51) Int. Cl.
C10G 45/64 (2006.01)
B01J 29/70 (2006.01)
B01J 29/74 (2006.01)
C10G 73/02 (2006.01)
B01J 29/80 (2006.01)
C10G 65/04 (2006.01)
B01J 35/02 (2006.01)
C10G 45/58 (2006.01)
C10G 65/12 (2006.01)
C10G 65/02 (2006.01)
B01J 37/18 (2006.01)
(Continued)

(52) U.S. Cl.
CPC ........... *B01J 29/7034* (2013.01); *B01J 29/70* (2013.01); *B01J 29/703* (2013.01); *B01J 29/74* (2013.01); *B01J 29/7461* (2013.01); *B01J 29/7469* (2013.01); *B01J 29/80* (2013.01); *B01J 35/0006* (2013.01); *B01J 35/023* (2013.01); *B01J 35/026* (2013.01); *B01J 37/0201* (2013.01); *B01J 37/18* (2013.01); *C10G 45/58* (2013.01); *C10G 45/60* (2013.01); *C10G 45/64* (2013.01); *C10G 65/02* (2013.01); *C10G 65/043* (2013.01); *C10G 65/10* (2013.01); *C10G 65/12* (2013.01); *C10G 73/02* (2013.01); *B01J 2229/123* (2013.01); *B01J 2229/16* (2013.01); *B01J 2229/186* (2013.01); *B01J 2229/20* (2013.01); *B01J 2229/42* (2013.01); *C10G 2300/1062* (2013.01); *C10G 2300/1074* (2013.01); *C10G 2300/202* (2013.01); *C10G 2300/301* (2013.01); *C10G 2400/10* (2013.01)

(58) Field of Classification Search
CPC . B01J 29/70; B01J 29/703; B01J 29/74; B01J 29/80; B01J 29/7034; B01J 29/7469; B01J 29/7461; B01J 2229/42; B01J 2229/16; B01J 2229/123; B01J 2229/186; B01J 2229/20; B01J 35/023; B01J 35/0006; B01J 35/026; B01J 37/18; B01J 37/0201; C10G 45/60; C10G 45/58; C10G 45/64; C10G 65/12; C10G 65/10; C10G 65/02; C10G 65/043; C10G 73/02; C10G 73/23; C10G 73/1074; C10G 2300/202; C10G 2300/301; C10G 2300/70; C10G 2300/1062; C10G 2400/10
USPC ........ 502/60, 63, 64, 66, 67, 68, 69, 71, 74, 502/77; 422/129, 134, 187, 211, 600, 422/630, 631, 632, 634, 635, 639, 642, 422/644; 585/310, 312; 208/424, 428, 208/429, 112, 118, 119, 120.35, 108, 109, 208/111.35, 18, 19, 20, 21, 49, 58, 59, 208/67, 68, 72, 73, 74, 75
See application file for complete search history.

(56) References Cited

U.S. PATENT DOCUMENTS 3,140,249 A 7/1964 Plank et al.
3,140,251 A 7/1964 Plank et al.
(Continued)

FOREIGN PATENT DOCUMENTS

CA 2694898 A1 2/2009
CN 1225113 A 8/1999
(Continued)

OTHER PUBLICATIONS

International Search Report and Written Opinion received for PCT Patent Application No. PCT/EP2017/082643 dated Apr. 13, 2018, 10 pages.
(Continued)

Primary Examiner — Elizabeth D Wood
(74) Attorney, Agent, or Firm — Shell Oil Company

(57) ABSTRACT

A catalyst system for dewaxing of a hydrocarbon feedstock comprising at least two catalytic sections, the first section comprising a first dewaxing catalyst and a subsequent section comprising a second dewaxing catalyst, wherein the first dewaxing catalyst is a ZSM-12 zeolite based catalyst and the second dewaxing catalyst is a EU-2 and/or ZSM-48 zeolite based catalyst. The catalyst system displays enhanced performance when compared to systems containing either ony ZSM-12 based catalyst or EU-2/ZSM-48 based catalyst only.

20 Claims, 1 Drawing Sheet

(51) Int. Cl.
  *B01J 35/00* (2006.01)
  *C10G 45/60* (2006.01)
  *B01J 37/02* (2006.01)
  *C10G 65/10* (2006.01)

(56) References Cited

U.S. PATENT DOCUMENTS

| | | |
|---|---|---|
| 3,140,253 A | 7/1964 | Plank et al. |
| 3,832,449 A | 8/1974 | Rosinski et al. |
| 4,205,053 A | 5/1980 | Rollmann et al. |
| 4,391,785 A | 7/1983 | Rosinki et al. |
| 4,452,769 A | 6/1984 | Chu et al. |
| 4,482,531 A | 11/1984 | Kuehl |
| 4,539,193 A | 9/1985 | Valyocsik |
| 4,552,738 A | 11/1985 | Rubin |
| 4,552,739 A | 11/1985 | Kuehl |
| 4,585,637 A | 4/1986 | Rubin |
| 4,585,746 A | 4/1986 | Valyocsik |
| 4,599,162 A | 7/1986 | Yen |
| 4,741,891 A | 5/1988 | Casci et al. |
| 4,753,910 A | 6/1988 | Han et al. |
| 4,767,522 A * | 8/1988 | Yen .................. B01J 29/80 208/111.05 |
| 5,021,141 A | 6/1991 | Rubin |
| 5,075,259 A | 12/1991 | Moran |
| 5,075,269 A | 12/1991 | Degnan et al. |
| 5,080,878 A | 1/1992 | Bowes et al. |
| 5,157,191 A | 10/1992 | Bowes et al. |
| 5,192,521 A | 3/1993 | Moini et al. |
| 5,234,872 A | 8/1993 | Apelian et al. |
| 5,242,676 A | 9/1993 | Apelian et al. |
| 5,246,568 A * | 9/1993 | Forbus .................. C10G 65/043 208/152 |
| 5,430,000 A | 7/1995 | Timken |
| 6,051,129 A | 4/2000 | Harris et al. |
| 6,576,120 B1 | 6/2003 | Van Ballegoy et al. |
| 6,652,832 B2 | 11/2003 | Malek |
| 6,893,624 B2 | 5/2005 | Lai et al. |
| 7,261,805 B2 | 8/2007 | Grove et al. |
| 7,704,379 B2 | 4/2010 | Jiang et al. |
| 8,298,403 B2 | 10/2012 | Elia et al. |
| 9,764,312 B2 | 9/2017 | Geerinck et al. |
| 9,987,623 B2 | 6/2018 | Domokos et al. |
| 10,544,374 B2 | 1/2020 | Kim et al. |
| 2004/0004020 A1* | 1/2004 | Grove .................. C10G 45/64 208/49 |
| 2004/0082461 A1 | 4/2004 | Remans et al. |
| 2004/0108245 A1 | 6/2004 | Jiang et al. |
| 2007/0138060 A1* | 6/2007 | Palmer .................. C10G 27/12 208/59 |
| 2009/0166252 A1 | 7/2009 | Daage et al. |
| 2009/0176643 A1 | 7/2009 | Elia et al. |
| 2009/0186754 A1 | 7/2009 | Elia et al. |
| 2010/0075831 A1 | 3/2010 | Elia et al. |
| 2010/0176027 A1 | 7/2010 | Oliveri et al. |
| 2011/0034759 A1 | 2/2011 | Ogdahl et al. |
| 2011/0118520 A1 | 5/2011 | Lai et al. |
| 2011/0174684 A1 | 7/2011 | Prentice et al. |
| 2011/0192766 A1 | 8/2011 | McCarthy et al. |
| 2013/0153463 A1* | 6/2013 | Geerinck ............. B01J 37/0009 208/60 |
| 2014/0209506 A1* | 7/2014 | Domokos .............. B01J 23/755 208/60 |
| 2017/0369794 A1* | 12/2017 | Renkema .............. C10G 57/00 |

FOREIGN PATENT DOCUMENTS

| | | |
|---|---|---|
| CN | 1703493 A | 11/2005 |
| CN | 1989089 A | 6/2007 |
| EP | 0188898 * | 7/1986 |
| EP | 2075314 A1 | 7/2009 |
| GB | 2077709 A | 12/1981 |
| RU | 2140819 C1 | 11/1999 |
| RU | 2177468 C2 | 12/2001 |
| WO | 9641846 A1 | 12/1996 |
| WO | 9641849 A1 | 12/1996 |
| WO | 0029512 A1 | 5/2000 |
| WO | 2005092792 A1 | 10/2005 |
| WO | 2007070521 A1 | 6/2007 |
| WO | 2010053468 A1 | 5/2010 |
| WO | 2012055755 A1 | 5/2012 |
| WO | 2013090534 A1 | 6/2013 |

OTHER PUBLICATIONS

International Search Report and Written Opinion received for PCT Patent Application No. PCT/EP2011/068329 dated Dec. 8, 2011, 10 pages.
International Search Report and Written Opinion received for PCT Patent Application No. PCT/US2012/069438 dated Mar. 6, 2013, 10 pages.
International Search Report and Written Opinion received for PCT Patent Application No. PCT/EP2011/068345 dated Dec. 13, 2011, 9 pages.
Database of Zeolite Structures, Catalog of Disorder in Zeolite Frameworks, 2000.
Database of Zeolite Structures, Framework Type MTW, 2007, Structure Commission of International Zeolite Association.
Porter et al., "The Effect of Calcination on the Microstructural Characteristics and Photoreactivity of Degussa P-25 Tio2", Journal of Materials Science, vol. 34, Issue No. 7, 1999, pp. 1523-1531.
Martens et al., "Synthesis of High-Silica Aluminosilicate Zeolites", Studies in Surface Science and Catalysis, vol. 33, 1987, p. 275.
Experimental data on European application 11771168.9-1352, pp. 1-3.

* cited by examiner

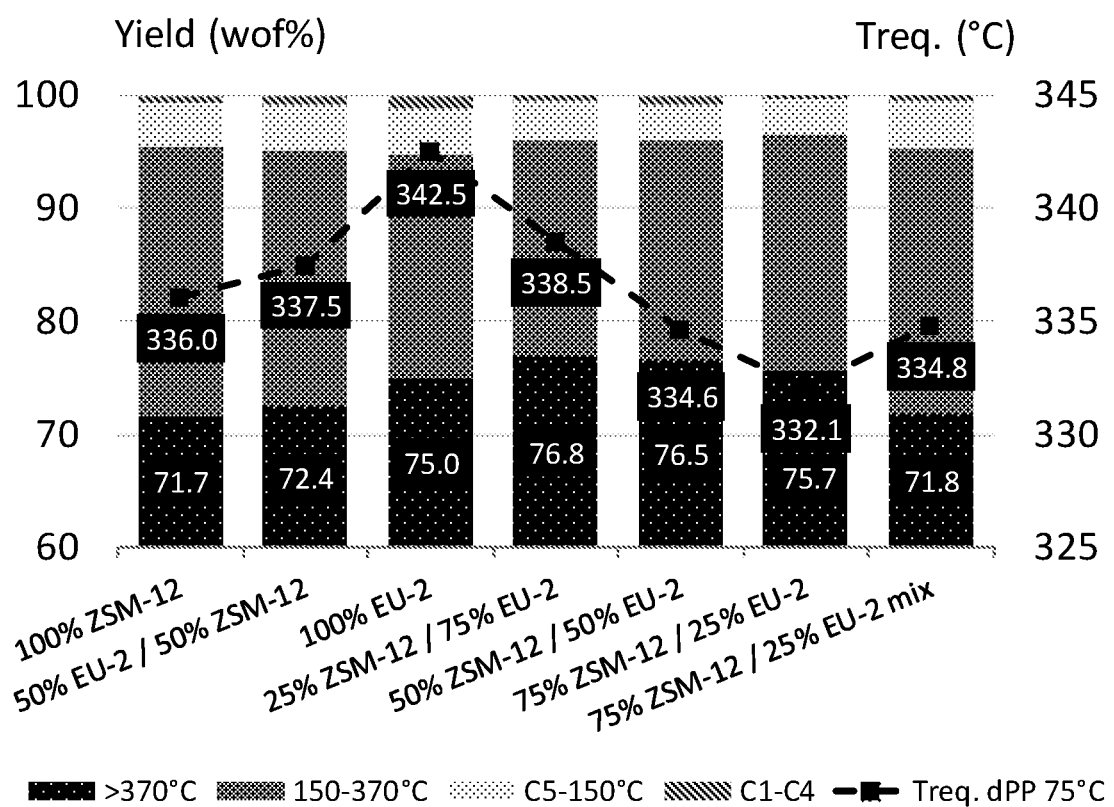

CATALYST SYSTEM FOR DEWAXING

CROSS REFERENCE TO RELATED APPLICATIONS

This is a national stage application of International Application No. PCT/EP2017/082643, filed 13 Dec. 2017, which claims benefit of priority to European Patent Application No. 16204786.4 filed 16 Dec. 2016.

The invention relates to catalyst system for dewaxing of a hydrocarbon feedstock comprising a ZSM-12 zeolite based catalyst and a EU-2 and/or ZSM-48 zeolite based catalyst, and a process for converting a hydrocarbon feedstock using said catalyst system.

BACKGROUND OF THE INVENTION

There are ongoing efforts to provide improved catalysts for use in the catalytic dewaxing of hydrocarbon feedstocks. Such improvements may include dewaxing catalysts having enhanced activity or which provide for improved lube stock yields when processing certain hydrocarbon feedstocks. Several types of zeolites have been developed for that purpose. For example, in WO 2012/055755 A and WO 2012/055759 A certain specific ZSM-48 and/or EU-2 zeolite based catalysts are described displaying improved hydrocarbon conversion performance. As described in the Catalog of Disorder in Zeolite Frameworks published in 2000, both ZSM-48 and EU-2 zeolite belong to the family of ZSM-48 zeolites. Therefore, in this text, where ZSM-48 is mentioned, also EU-2 can be read, and vice versa. Another zeolite, the crystalline zeolite designated ZSM-12, is described in U.S. Pat. No. 3,832,449 A. ZSM-12 zeolites are indicated in the '449 patent as having catalytic characteristics being useful in petroleum refining processes that include processes for the reduction of the pour point of paraffinic charge stocks and the isomerization of n-paraffins and naphthenes.

There is a constant need for more active and/or selective catalysts for catalytic dewaxing of hydrocarbon feedstocks. In order to arrive at increased activity, it is not uncommon to increase the zeolite content of catalysts. However, that is accompanied by higher costs of materials of the catalysts.

Other solutions have also been considered. For example, U.S. Pat. No. 4,599,162 A describes a dual catalyst cascade process for dewaxing of hydrocarbon feedstocks, in which the waxy feedstock is passed over a crystalline silicate zeolite catalyst having a Constraint Index between 2 and 12 and then over a different crystalline silicate zeolite catalyst having a Constraint Index no less than 2.

Specifically, said patent is directed to a cascade catalytic hydrodewaxing process comprising (a) passing a hydrocarbon feedstock containing waxy components selected from a group of normal paraffins and slightly branched chain paraffins over a hydroisomerization catalyst comprising a crystalline silicate zeolite having the structure ZSM-12 in admixture with a crystalline silicate zeolite having the structure of ZSM-23, said admixture having hydrogenation/dehydrogenation activity to hydroisomerise the feedstock; and (b) passing at least a majority of the normally liquid hydrocarbon recovered from step (a) over a de-waxing catalyst comprising a crystalline silicate zeolite having a structure of ZSM-5, said zeolite of step (b) having hydrogenation/dehydrogenation activity to dewax the recovered hydrocarbon.

Examples in U.S. Pat. No. 4,599,162 A utilise a dual catalyst operation, wherein in a first reactor zone, a catalyst comprising 0.44% Pt/ZSM-12 and ZSM-23 in admixture is employed, whilst in a second reactor zone, a catalyst comprising a Ni/ZSM-5 based catalyst is employed. The results reported in Table 2 of U.S. Pat. No. 4,599,162 A however indicate a significant gas make (C1-C5 yield range from 7.4 to 9.8 wt. %), which is disadvantageous for the base oil.

Further, in U.S. Pat. No. 7,261,805 B2 a process is described for upgrading a hydrocarbon feedstock containing waxy components and having an end boiling point exceeding 650° F. (343° C.), which includes contacting the feedstock at superatmospheric hydrogen partial pressure with an isomerization dewaxing catalyst that includes ZSM-48 and then contacting the dewaxed product with a hydrocracking catalyst to produce an upgraded product with a reduced wax content. The product of the process of the '805 patent is a distillate having a boiling range of about 330° F. (166° C.) to 730° F. (387° C.).

Despite all advances that already have been made in catalyst dewaxing, there is still a need for new developments to increase performance of the catalyst, preferably also with better base oil yield and selectivity for certain product ranges, while still being economically attractive. It is an object of the present invention to address deficiencies of the prior art.

SUMMARY OF THE INVENTION

It has now been found that improved catalyst performance in terms of an enhanced selectivity and/or a higher catalyst activity can be effected in another way than suggested in the prior art.

Surprisingly, it has now been found that a stacked catalyst system with a ZSM-12 based catalyst in the top of the stack and a EU-2 (ZSM-48) based catalyst in the bottom of the stack exhibits both enhanced performance and an improved base oil yield when compared to catalyst systems containing only a ZSM-12 or a EU-2(ZSM-48) based catalyst, respectively.

Accordingly, the present invention provides a catalyst system for dewaxing of a hydrocarbon feedstock comprising at least two catalytic sections, the first section comprising a first dewaxing catalyst and a subsequent section comprising a second dewaxing catalyst, wherein the first dewaxing catalyst is a ZSM-12 zeolite based catalyst and the second dewaxing catalyst is a EU-2 and/or ZSM-48 zeolite based catalyst.

The catalyst system of the invention is particularly useful for the production of base oils. Accordingly, the present invention also relates to a process for dewaxing comprising contacting a hydrocarbon feedstock with a catalyst system according to the present invention.

DETAILED DESCRIPTION OF THE INVENTION

The ZSM-12 zeolite based catalyst used in the catalyst system of this invention can, for example, be made according to procedures described for comparative catalyst composition A in WO 2013/090534 A.

In a preferred embodiment of the present invention, the ZSM-12 zeolite based catalyst does not contain any additional zeolites therein.

An important feature of the ZSM-12 zeolite component is to have a silica-to-alumina ratio that is sufficiently high to provide for a final dewaxing catalyst that exhibits desired catalytic properties of high activity while providing for a high yield. To provide for this, the ZSM-12 zeolite component preferably has a silica-to-alumina ratio (also referred to sometimes herein as "SAR"; units are mol:mol) that is at least 50:1. The silica-to-alumina ratio, as the term is used herein, references the molar ratio of silica and alumina contained in the framework of the zeolite. Preferably, the SAR is greater than 60:1, or greater than 70:1, or greater than 75:1. An upper limit to the SAR of the ZSM-12 zeolite component is preferably at most 250:1, more specifically, the upper limit is a 200:1, and more preferably less than 150:1, in particular less than 110:1. If the SAR of the as-synthesized ZSM-12 zeolite is too low, it may further dealuminated using methods known in the art to provide a dealuminated ZSM-12 zeolite having the desired silica-to-alumina ratio that can be used as a component of the inventive catalyst system.

The ZSM-12 zeolite content of the final composition of the invention should be at least 10 wt. % and at most 70 wt. % of the total dry weight of the composition. The binder content of the final composition of first catalyst used in the catalyst system of the invention can be in the range of from at least 30 wt. % and no more than 90 wt. % of the total dry weight of the composition. It is preferred for the ZSM-12 zeolite content of the composition to be at most 60 wt. %, more preferred, at most 50 wt %, and more particular at most 40 wt. %. It is further preferred for the ZSM-12 zeolite content of the composition to be at least 15 wt. %, and more preferred, at least 20 wt. %.

The EU-2/ZSM-48 zeolite based catalyst used in the catalyst system of this invention can, for example, be made according to procedures described in WO 2012/055755 A for dealuminated ZSM-48 and/or EU-2 zeolite based catalysts comprising a refractory oxide binder essentially free of alumina. The SAR of the EU-2 and/or ZSM-48 zeolite preferably is at least 60, more preferably at least 70, more specifically at least 80, most preferably at least 90. The SAR of the EU-2 and/or ZSM-48 zeolite preferably is at most 300, more specifically at most 250, more specifically at most 200, most specifically at most 150.

When contents of binder and zeolite are used in the context of the present invention, the content on a dry basis is meant. The EU-2/ZSM-48 zeolite based catalyst composition of the present invention preferably comprises at most 70% by weight (wt. %) of the EU-2/ZSM-48 zeolite, more specifically at most 65 wt. %, more specifically at most 60 wt. %, most preferably at most 55 wt. %. Further, it is preferred that the amount of the zeolite is at least 15 wt. %, more specifically at least 20 wt. %, more specifically at least 25 wt. %, most specifically at least 30 wt. %.

Optionally, a further zeolite may be present in the EU-2/ZSM-48 zeolite based catalyst besides the EU-2/ZSM-48 zeolite; if that is the case, such zeolite preferably is present in an amount of at most 50 wt. %, based on the amount of EU-2/ZSM-48 zeolite that is present. The binder content of the final composition of second catalyst used in the catalyst system of the invention can be in the range of from at least 30 wt. % and no more than 85 wt. % of the total dry weight of the composition.

When reference is made to binders in this context, refractory oxide binders are meant. Examples of refractory oxide binder materials are alumina, silica, zirconia, titanium dioxide, germanium dioxide, boria and mixtures of two or more of these like for example silica-zirconia and silica-titania. Preferred binders are titania, zirconia and/or silica. Silica is a particularly preferred binder in the ZSM-12 zeolite based catalyst and the EU-2/ZSM-48 zeolite based catalyst used in the catalyst system of the present invention.

The ZSM-12 zeolite based catalyst and the EU-2/ZSM-48 zeolite base catalyst used in the catalyst system of the invention, further preferably each comprise a noble metal component which is preferably selected from the group of noble metals consisting of palladium and platinum. The preferred noble metal, however, is platinum for both the ZSM-12 zeolite based catalyst and the EU-2/ZSM-48 zeolite based catalyst. The noble metal component is preferably incorporated into the mixture or particle after its treatment or dealumination. However, the noble metal component may also incorporated into the mixture or particle before treatment or dealumination. Any known suitable means or method may be used to incorporate the noble metal component into the mixture or particle.

It is desirable for the ZSM-12 zeolite based catalyst and the EU-2/ZSM-48 zeolite based catalyst used in the catalyst system of the invention to have a noble metal content in the range of upwardly to about 3 wt. % based on the noble metal as an element, regardless of its actual form, and the total dry weight of the catalyst composition. It is preferred for the noble metal component to be present in the catalyst composition at a concentration in the range of from 0.1 wt. % to 3 wt. %. More preferably, the noble metal component is present in the composition in an amount in the range of from 0.2 wt. % to 2 wt. %, and, most preferably, it is in the range of from 0.3 wt. % to 1 wt. %.

The ZSM-12 and EU-2/ZSM-48 based zeolite catalyst materials are further extruded, dried and calcined according to methods known in the art.

The catalyst system according to the present invention comprises any system in which the ZSM-12 and EU-2/ZSM-48 based zeolite catalysts are placed in any subsequent order of first the ZSM-12 based catalyst, followed by the EU-2/ZSM-48 based catalyst. In this context the feedstock that needs to be dewaxed first passes the ZSM-12 based catalyst and after that the EU-2/ZSM-48 based catalyst. The catalysts can be stacked in a layered configuration, they can be provided in the same bed but still in separate layers, in separate zones/sections or in separate beds, or each of the catalysts may be provided in multiple beds, and the catalyst may be provided in the same reactor, in separate reactors or each in multiple reactors, optionally separated by for example a filtration section or cleaning section. It is understood that in all these configurations the hydrotreated feed that will be dewaxed over any of these catalyst configurations needs first pass the ZSM-12 based catalyst and then the EU-2/ZSM-48 based catalyst.

In the catalyst system of the present invention, the catalyst volume ratio of the first dewaxing catalyst to the second dewaxing catalyst preferably is in the range of 10:90 to 90:10. More preferred, that ratio is from 20:80 to 90:10, even more preferred from 40:60 to 85:15. A highly preferred catalyst volume ratio of the first dewaxing catalyst to the second dewaxing catalyst is 75:25.

The catalyst system of the present invention is prepared using conventional methods and conventional means. Any type of reactor may be loaded in such a way that the feed will first pass the ZSM-12 based catalyst and subsequently the EU-2/ZSM-48 based catalyst. When for example an industrial reactor is operated in a top-down flow, the preparation of the catalyst system generally will comprise loading the reactor with the ZSM-12 and EU-2/ZSM-48 based catalysts in such a way that the EU-2/ZSM-48 based catalyst is positioned in the lower sections of the reactor (when operated Top-Down flow) and loading the ZSM-12 based catalyst above that. For completeness, it must be mentioned that below the EU-2/ZSM-48 based catalyst another catalyst can be present for e.g. hydrofinishing purposes.

For commercial units various loading techniques are available which are often executed by specialised companies (like the Dutch company "Mourik").

The catalyst system of the present invention is highly suitable for use in dewaxing of hydrocarbon feedstocks. The system can be placed as the dewaxing section in any conventional line up comprising a section for dewaxing of hydrocarbon feedstocks.

In a preferred embodiment of the present invention, the hydrocarbon feedstock may be pre-treated upstream of the catalyst system, for example, in a separate guard or catalyst bed, to reduce or remove any nitrogen- and sulfur-containing compounds and/or aromatic compounds present therein. Alternatively, a further catalyst may be used upstream of the catalyst system of the present invention in the same reactor bed in order to pre-treat the feedstock prior to contact with said catalyst system.

Catalytic dewaxing is used to improve cold flow properties of diesel fuels and lube oils by selective hydroisomerization/hydrocracking of normal and slightly branched paraffins. In distillate dewaxing, the dewaxing process reduces the pour point of the feedstock preferably by at least 10° C., more preferably by at least 20° C. The current catalyst system may be used for conventional diesel fuels dewaxing to deep dewaxing (Artic grade production) in first and second stage applications, in combination with high pressure hydrocracking or mild hydrocracking catalyst package, in mild hydrocracker bottoms pour point reduction for storage and transportation and/or to produce lubes of exceptional quality. The catalyst system of the present invention is particularly useful for producing base oils.

Accordingly, the present invention further relates to a process for dewaxing of a hydrocarbon feedstock comprising contacting a hydrocarbon feedstock with a catalyst system of the invention at an elevated temperature, preferably from 200° C. up to 450° C. and a pressure of from 5×105 to 200×105 Pa. More specifically, the temperature is from 250 to 400° C., preferably of from 275 to 375° C. The total pressure is more specifically of from 15×105 to 170× 105 Pa, preferably of from 25×105 to 150×105 Pa. The liquid hourly space velocity preferably is in the range of from 0.1 to 10 h−1.

Suitable hydrocarbon oil feeds to be employed in the dewaxing process according to the present invention are mixtures of high-boiling hydrocarbons, such as, for instance, heavy oil fractions. It has been found particularly suitable to use vacuum distillate fractions derived from an atmospheric residue, i.e. distillate fractions obtained by vacuum distillation of a residual fraction which in return is obtained by atmospheric distillation of a crude oil, as the feed. The boiling range of such a vacuum distillate fraction is usually between 300 and 620° C., suitably between 350 and 580° C. However, deasphalted residual oil fractions, including both deasphalted atmospheric residues and deasphalted vacuum residues, may also be applied. The feedstock to be subjected to dewaxing preferably is a gas oil or a lube oil basestock.

Thus, in one embodiment, the feedstocks are wax-containing feeds that boil in range usually between 130 and 450° C., suitably between 150 and 390° C. These are the boiling ranges for diesel, kerosene and jet fuel.

In a preferred embodiment, the feedstock is a lube oil basestock. Such feedstocks preferably are wax-containing feeds that boil in the lubricating oil range typically having a 10% distillation point at 200° C. or higher, ranging to 600° C., as measured by ASTM D-2887-93. Examples of feeds having relatively high amounts of waxy compounds are synthetic waxy raffinates (Fischer-Tropsch waxy raffinates), hydrocracker bottom fractions (hydrowax), i.e. those fractions having a final boiling point of at least 320° C., preferably at least 360° C. and slack waxes obtained from the dewaxing of hydroprocessed or solvent refined waxy distillates. These feeds have a wax content of at least 50% by weight, preferably at least 80% by weight and more preferably at least 90% by weight. The wax content is the content of compounds which are plastic at ambient temperature and melt above 45° C. to give a low viscosity liquid. The amount of wax can be determined by the ASTM method D3235.

If a feedstock contains substantial amounts of sulphur- and/or nitrogen-containing contaminants, for example, having sulphur levels up to 3% by weight and nitrogen levels up to 1% by weight, it may be advantageous to subject that feedstock to a hydro-desulphurisation and hydrodenitrogenation step prior to the catalytic dewaxing process using the catalytic system of the present invention.

The process of the present invention can be used to prepare lubricating base oils having viscosity indices (VI) above 120 and particularly above 135.

Furthermore, the feedstocks may have been hydrotreated and/or hydrocracked before being subjected to dewaxing. Hydrotreating generally involves contacting feedstock with a hydrotreating catalyst at a temperature of up to 500° C., more specifically of from 250 to 500° C., and a hydrogen partial pressure of from 10×105 to 200×105 Pa, more specifically of from 30×105 to 130×105 Pa. Hydrocracking generally involves contacting feedstock with a hydrocracking catalyst at a hydrogen partial pressure (at the reactor inlet) in the range from 3×106 to 2.9×107 Pa, more preferably from 8×106 to 1.75×107 Pa and a ratio of hydrogen gas to feedstock (total gas rate) in the range from 100 to 5000 Nl/kg, but preferably in the range from 200 to 3000 Nl/kg.

BRIEF DESCRIPTION OF THE DRAWING

FIG. 1 shows performance data of catalyst stacks with ZSM-12 and EU-2 based catalysts when compared to ZSM-12 only and EU-2 only catalysts, respectively. Also the performance data of a ZSM-12/EU-2 catalyst mixture is shown.

Legends: "wof %" is the wt. % on feed. "C1-C4" indicates the amount of product containing 1, 2, 3, or 4 carbon atoms. "C5-150° C." indicates the amount of product with carbon number 5 up to products that have a boiling point of 150° C. "150-370° C." indicates the amount of product with a boiling point in the range between 150 and 370° C. ">370° C." indicates the amount of product with a boiling point of 370° C. or higher as measured with ASTM D2887-93. "Treq.dPP 75° C." stands for the required reactor temperature to obtain a pour point (PP) improvement of 75° C.

The method of the invention will now be illustrated by the following non-limiting examples.

EXAMPLES

Example 1

ZSM-12 Composition

An extrudable mass was prepared by combining ZSM-12 zeolite having a SAR of 90 from Zeolyst International with amorphous silica, ammonia and water. The mass was extruded to give extrudates having a cylinder shape and an average diameter of 1.6 mm. These extrudates were dried and calcined resulting in white extrudates.

The extrudates were treated unstirred at a temperature of 90° C. for 5 hours with aqueous ammonium hexafluorosilicate (AHS) solution. The weight ratio of solution to extrudates was 5:1. Subsequently, the extrudates were separated from the solution, washed with deionized water, and dried and calcined.

Thereafter, 0.7% wt./wt. platinum was incorporated into the composition by pore volume impregnation during about 10 minutes with an aqueous solution containing tetramine platinum nitrate (Pt(NH3)4(NO3)2) (3.37% wt./wt. Pt).

The impregnated composition was not washed, but equilibrated during 1.5 hours on a rolling bed, dried and calcined. Then, the catalyst was cooled down to room temperature.

Example 2

EU-2 (ZSM-48) Composition

Zeolite EU-2 (ZSM-48) having a SAR of 110 was prepared as described in U.S. Pat. No. 4,741,891 A. An extrudable mass was prepared by combining EU-2 with amorphous silica, ammonia and water. The mass was extruded to give extrudates having a cylinder shape and an average diameter of 1.6 mm. These extrudates were dried and calcined resulting in white extrudates.

The extrudates were treated unstirred at a temperature of 90° C. for 5 hours with aqueous ammonium hexafluorosilicate (AHS) solution. The weight ratio of solution to extrudates was 5:1. Subsequently, the extrudates were separated from the solution, washed with deionized water, and dried and calcined.

Thereafter, 0.7% wt./wt. platinum was incorporated into the composition by pore volume impregnation during about 10 minutes with an aqueous solution containing tetramine platinum nitrate (Pt(NH3)4(NO3)2) (3.3% wt./wt. Pt).

The impregnated composition was not washed, but equilibrated during 1.5 hours on a rolling bed, dried and calcined. Then, the catalyst was cooled down to room temperature.

Example 3

Performance Testing of Stacked Catalysts

The catalysts of Examples 1 and 2 were dried at 250° C. for 3 hours. Subsequently, each of the catalysts was mixed with sufficient inert material (e.g. SiC) to assure proper plug flow conditions and loaded into a single tube test reactor of down flow mode (comparative examples). For preparing the stacked examples, the catalysts—mixed with sufficient inert material—were loaded on top of each other into a single tube test reactor of down flow mode.

In total, 4 stacked examples were prepared:
(a) 50% "EU-2"/50% "ZSM-12";
(b) 25% "ZSM-12"/75% "EU-2";
(c) 50% "ZSM-12"/50% "EU-2"; and
(d) 75% "ZSM-12"/25% "EU-2",
wherein "EU-2" refers to the catalyst of Example 2 and "ZSM-12" refers to the catalyst of Example 1.

Thus, e.g. 25% "ZSM-12"/75% "EU-2" means: 25% of the total dewaxing catalyst volume is occupied by the catalyst with ZSM-12 being located in the top of the stack, and 75% of the total dewaxing catalyst volume is occupied by the catalyst with EU-2 being located in the bottom of the stack.

Subsequently, a hydrogen partial pressure was applied of 140 bar and then the temperature was increased from room temperature to 125° C. at a rate of 20° C./h, and held for two hours. The temperature was increased further to 300° C. at a rate of 50° C./h, and held for 8 hours to ensure proper reduction of the metallic phase. The reactor was cooled to 200° C. and then the feed of Table 1 was introduced. After feed breakthrough, the temperature was increased to 250° C. in 4 hours, and held overnight. The feed of Table 1 was added at a weight hourly space velocity of 1.2 kg 1-1 h-1.

TABLE 1

| Feed | | |
|---|---|---|
| Density at 70/4° C. | g/ml | 0.8197 |
| Carbon content | wt. % | 85.99 |
| Hydrogen content | wt. % | 14.01 |
| Sulphur content, | wt. % | 0.001 |
| Nitrogen content, | ppmw | 0.0004 |
| UV Aromatics | | |
| Mono-aromatics | wt. % | 1.47 |
| Di-aromatics | wt. % | 0.17 |
| Tri-aromatics | wt. % | 0.09 |
| Tetra+-aromatics | wt. % | 0.13 |
| Pour Point | ° C. | 42 |
| TBP-GLC | | |
| 0.5 wt. % recovery (IBP) | ° C. | 251 |
| 10 wt. % recovery | ° C. | 358 |
| 90 wt. % recovery | ° C. | 519 |
| 98 wt. % recovery | ° C. | 568 |
| 99.5 wt. % recovery | ° C. | 595 |

The performance of the catalyst or catalyst stacks was evaluated at temperatures in the range between 330° C. and 350° C.

[Method: The performance of the catalyst (stack) was evaluated at temperatures in the range between 330° C. and 350° C. The performance of the catalyst (stacks) is evaluated at a pour point improvement of 75° C., which means that the product has a pour point which is 75° C. lower than the pour point of the feedstock. The pour points are measured according to ASTM D97. The feed of Table 1 was added at a weight hourly space velocity of 1.2 kg 1-1 h-1.]

The performances of the catalyst/catalyst stacks are shown in FIG. 1. In this FIGURE, the expression wof % stands for the wt. % on feed. C1-C4 stands for the amount of product containing 1, 2, 3, or 4 carbons. C5-150° C. stands for the amount of a hydrocarbon product with carbon number 5 up to products that have a boiling point of 150° C. 150-370° C. stands for the amount of product which has a boiling point that falls in the range between 150 and 370° C.>370° C. stands for the amount of product which has a boiling point of 370° C. or higher as measured with ASTM D2887-93. "Treq.dPP 75° C." stands for the required reactor temperature to obtain a pour point (PP) improvement of 75° C.

In Table 2 the results are listed with their numerical values.

Example 4

The catalysts of Examples 1 and 2 were dried at 250° C. for 3 hours. Subsequently, a mixture of 75% of the ZSM-12 based catalyst and 25% of the EU-2(ZSM-48) based catalyst was prepared. Then the ZSM-12/EU-2(ZSM-48) catalyst mixture was mixed with 0.1 mm SiC inert material in a 1:1 vol/vol ratio to assure proper plug flow conditions and carefully loaded into a single tube test reactor of down flow mode. This happened in a similar way as in Example 3, where the catalysts were loaded on top of each other. The total catalyst volume was 20 ml. Subsequently, a hydrogen partial was applied of 140 bar and then the temperature was increased from room temperature to 125° C. at a rate of 20° C./h, and held for two hours. The temperature was increased further to 300° C. at a rate of 50° C./h, and held for 8 hours to ensure proper reduction of the metallic phase. The reactor was cooled to 200° C. and then the feed of Table 1 was introduced. After feed breaks through the temperature was increased to 250° C. in 4 hours, and held overnight.

The performance of the catalyst was evaluated according to the method described in Example 3.

The performance of the catalyst mixture is shown in FIG. 1 next to the performance of the catalyst stacks. For an explanation of the numbers and abbreviations in the FIGURE, see Example 3.

In Table 2 the results are listed with their numerical

TABLE 2

| label | | 100% ZSM-12 | 50% EU-2/50% ZSM-12 | 100% EU-2 | 25% ZSM-12/75% EU-2 | 50% ZSM-12/50% EU-2 | 75% ZSM-12/25% EU-2 | 75% ZSM-12/25% EU-2 mix |
|---|---|---|---|---|---|---|---|---|
| Treq. dPP 75° C. | ° C. | 336 | 338 | 342 | 339 | 335 | 332 | 335 |
| Yields: | | | | | | | | |
| C1-C4 | wof % | 0.5 | 0.8 | 1.1 | 0.8 | 0.7 | 0.6 | 0.7 |
| C5-150° C. | wof % | 4.0 | 4.1 | 4.0 | 3.5 | 3.2 | 3.2 | 4.3 |
| 150-370° C. | wof % | 23.7 | 22.6 | 19.8 | 19.2 | 19.5 | 20.7 | 23.5 |
| >370° C. | wof % | 71.7 | 72.4 | 75.0 | 76.8 | 76.5 | 75.7 | 71.8 |

CONCLUSION

It can be concluded from the performance data of Examples 3 and 4, that the stacked catalyst system of the present invention with a ZSM-12 based catalyst in the top of the stack and a EU-2 based catalyst in the bottom of the stack exhibits an enhanced performance and an improved base oil yield, not only when compared to a catalyst system containing only a EU-2 based catalyst, but also when compared to a proportionate mixture of both catalysts. Further, the stacked system of the present invention exhibits an improved base oil yield when compared to a catalyst system containing only a ZSM-12 based catalyst, whereas the performance is very well comparable to or even better than a catalyst system containing only a ZSM-12 based catalyst.

That which is claimed is:

1. A process for dewaxing a hydrocarbon feedstock, wherein the process comprises: passing the hydrocarbon feedstock to a stacked catalyst system that comprises at least two separate catalytic zones, including a first separate zone, containing a first volume of a first dewaxing catalyst, and a second volume of a second separate zone, containing a second dewaxing catalyst, wherein the stacked catalyst system has a catalyst volume ratio of the first volume-to-second volume in the range of from 10:90 to 90:10; wherein the first dewaxing catalyst comprises ZSM-12 having a silica-to-alumina ratio of at least 50:1 to at most 250:1 and in an amount of at least 10 wt. % and at most 70 wt. %, a binder in an amount of at least 30 wt. % and no more than 90 wt. %, and from 0.1 wt. % to about 3 wt. % of a noble metal component selected from the group consisting of palladium and platinum, with such wt. % being based on the dry weight of the first dewaxing catalyst, and wherein the second dewaxing catalyst comprises EU-2 and/or ZSM-48 having a silica-to-alumina ration of at least 60:1 to at most 300:1 and in an amount of at least 15 wt. % and at most 70 wt. %, a binder in an amount of at least 30 wt. % and no more than 85 wt. %, and from 0.1 wt. % to about 3 wt. % of a noble metal component selected from the group consisting of palladium and platinum, with such wt. % being based on the dry weight of the composition; and wherein the hydrocarbon feedstock first passes to the first dewaxing catalyst followed by passing it to the second dewaxing catalyst, wherein the hydrocarbon feedstock is contacted with the stacked catalyst system at a temperature from 200° C. up to 450° C. and a pressure of from 5 to 200×10$^5$ Pa.

2. The process of claim 1, wherein the first dewaxing catalyst further comprises from 0.2 wt. % to 2 wt. % of a noble metal component selected from the group consisting of palladium and platinum, and the second dewaxing catalyst further comprises from 0.2 wt. % to 2 wt. % of a noble metal component selected from the group consisting of palladium and platinum.

3. The process of claim 1, wherein the ZSM-12 zeolite has a silica to alumina molar ratio of greater than 60:1 and at most 200:1.

4. The process of claim 1, wherein the EU-2 and/or ZSM-48 zeolite has a silica to alumina molar ratio of at least 70:1 and at most 250:1.

5. The process of claim 1, wherein the catalyst volume ratio of the first dewaxing catalyst to the second dewaxing catalyst is in the range of 20:80 to 90:10.

6. The process according to claim 1, in which process the hydrocarbon feedstock is a wax-containing feed that boils in the lubricating oil range having a 10% distillation point at 200° C. or higher, as measured by ASTM D-2887-93.

7. A process for dewaxing a hydrocarbon feedstock, wherein the process comprises:
   providing one or more reactors, wherein each is loaded with a stacked catalyst system, comprising at least two separate catalytic zones, including a first separate zone, containing a first volume of a first dewaxing catalyst, and a second separate zone, containing a second dewaxing catalyst, wherein the first dewaxing catalyst is a second volume of a ZSM-12 zeolite based catalyst and the second dewaxing catalyst is a EU-2 and/or ZSM-48 zeolite based catalyst, wherein the stacked catalyst system has a catalyst volume ration of the first volume-to-the second volume in the range of from 10:90 to 90:10; and
   passing a hydrocarbon feed over the first dewaxing catalyst followed by the second dewaxing catalyst;
   wherein the first dewaxing catalyst comprises ZSM-12, having a silica-to-alumina ratio of at least 50:1 to at most 250:1, and in an amount of at least 15 wt. % and at most 70 wt. %, a binder in an amount of at least 30 wt. % and no more than 90 wt. %, and from 0.1 wt. % to about 3 wt. % of a noble metal component selected from the group consisting of palladium and platinum, with such wt. % being based on the dry weight of the first dewaxing catalyst; and wherein the second dewaxing catalyst comprises EU-2 and/or ZSM-48, having a silica-to-alumina ratio of at least 60:1 and at most 300:1, and in an amount of at least 15 wt. % and at most 70 wt. %, a binder in an amount of at least 30 wt. % and no more than 85 wt. %, and from 0.1 wt. % to about 3 wt. % of a noble metal component selected from the group consisting of palladium and platinum, with such wt. % being based on the dry weight of the second dewaxing catalyst.

8. The process of claim 7, wherein the first dewaxing catalyst comprises ZSM-12 in an amount of at least 30 wt. % and at most 60 wt. %.

9. The process of claim 8, wherein the second dewaxing catalyst comprises EU-2 and/or ZSM-48 in an amount of at least 20 wt. % and at most 65 wt. %.

10. The process of claim 9, wherein the first dewaxing catalyst further comprises 0.2 wt. % to 2 wt. % of a noble metal component selected from the group consisting of palladium and platinum, and the second dewaxing catalyst further comprises 0.2 wt. % to 2 wt. % of a noble metal component selected from the group consisting of palladium and platinum.

11. The process of claim 10, wherein the ZSM-12 zeolite has a silica to alumina molar ratio of greater than 60:1 and at most 200:1.

12. The process of claim 11, wherein the EU-2 and/or ZSM-48 zeolite has a silica to alumina molar ratio of at least 70:1 and at most 250:1.

13. The process of claim 12, wherein the catalyst volume ratio of the first dewaxing catalyst to the second dewaxing catalyst is in the range of 20:80 to 90:10.

14. A process, comprising: passing a feed to a reactor system, wherein the reactor system comprises a reactor operated in a top down flow arrangement and loaded with a stacked catalyst system, wherein the stacked catalyst system comprises a first zone containing a first volume of a first dewaxing catalyst, comprising a ZSM-12 zeolite based catalyst, positioned top of the stacked catalyst system, and a second zone containing a second volume of a second dewaxing catalyst, comprising EU-2 and/or ZSM-48 zeolite based catalyst positioned in a lower section of the reactor, wherein the reactor is loaded such that the feed first passes the first dewaxing catalyst followed by the second dewaxing catalyst, wherein the first dewaxing catalyst comprises ZSM-12, having a silica-to-alumina ratio of at least 50:1 to at most 250:1, and in an amount of at least 15 wt. % and at most 70 wt. %, a binder in an amount of at least 30 wt. % and no more than 90 wt. %, and from 0.1 wt. % to about 3 wt. % of a noble metal component selected from the group consisting of palladium and platinum, with such wt. % being based on the dry weight of the first dewaxing catalyst, and wherein the second dewaxing catalyst comprises EU-2 and/or ZSM-48, having a silica-to-alumina ratio of at least 60:1 and at most 300:1, and in an amount of at least 15 wt. % and at most 70 wt. %, a binder in an amount of at least 30 wt. % and no more than 85 wt. %, and from 0.1 wt. % to about 3 wt. % of a noble metal component selected from the group consisting of palladium and platinum, with such wt. % being based on the dry weight of said second dewaxing catalyst.

15. The process of claim 14, wherein the first dewaxing catalyst comprises ZSM-12 in an amount of at least 15 wt. % and at most 60 wt. %.

16. The process of claim 15, wherein the second dewaxing catalyst comprises EU-2 and/or ZSM-48 in an amount of at least 15 wt. % and at most 70 wt. % and a binder in an amount of at least 30 wt. % and no more than 85 wt. %, with such wt. % being based on the dry weight of said second dewaxing catalyst.

17. The process of claim 16, wherein the first dewaxing catalyst further comprises from 0.2 wt. % to 2 wt. % of a noble metal component selected from the group consisting of palladium and platinum, and the second dewaxing catalyst further comprises from 0.2 wt. % to 2 wt. % of a noble metal component selected from the group consisting of palladium and platinum.

18. The process of claim 17, wherein the ZSM-12 zeolite has a silica to alumina molar ratio of at least 60:1 and at most 200:1.

19. The process of claim 18, wherein the EU-2 and/or ZSM-48 zeolite has a silica to alumina molar ratio of greater than 70:1 and at most 250:1.

20. The reactor system of claim 19, wherein the catalyst volume ratio of the first dewaxing catalyst to the second dewaxing catalyst is in the range of 20:80 to 90:10.

* * * * *